United States Patent [19]
Tjebben

[11] 3,770,917
[45] Nov. 6, 1973

[54] DRAW OUT SWITCHGEAR ASSEMBLY WITH SUSPENDED LINEAR GUIDE SUPPORT MEANS FOR MOVABLE CONTACTOR

[75] Inventor: John O. Tjebben, Wauwatosa, Wis.

[73] Assignee: Allis-Chalmers Corporation, Milwaukee, Wis.

[22] Filed: June 2, 1972

[21] Appl. No.: 259,145

[52] U.S. Cl. .......................................... 200/50 AA
[51] Int. Cl. ............................................. H01h 9/00
[58] Field of Search ..................... 200/50 A, 50 AA; 317/103

[56] References Cited
UNITED STATES PATENTS

| 3,691,332 | 9/1972 | Sharp | 200/50 AA X |
| 3,663,773 | 5/1972 | Powell | 200/50 AA |
| 2,921,998 | 1/1960 | Pokorny et al. | 200/50 AA |
| 2,412,931 | 12/1946 | West | 200/50 AA |
| 2,295,405 | 9/1942 | Johnson et al. | 200/50 AA UX |
| 3,005,064 | 10/1961 | Baird et al. | 200/50 AA |

Primary Examiner—J. R. Scott
Attorney—Robert C. Jones et al.

[57] ABSTRACT

The invention relates to a motor controller apparatus in which a single, glass polyester molding is provided as the major structural support element of the apparatus. The apparatus is slidably supported within its enclosure from the side frame of the enclosure to provide a compact unit without sacrificing adequate internal spacing for necessary wiring and components. A novel handle mechanism provides interlocking of the apparatus within the cabinet in relation to the open or closed condition of the access door.

13 Claims, 11 Drawing Figures

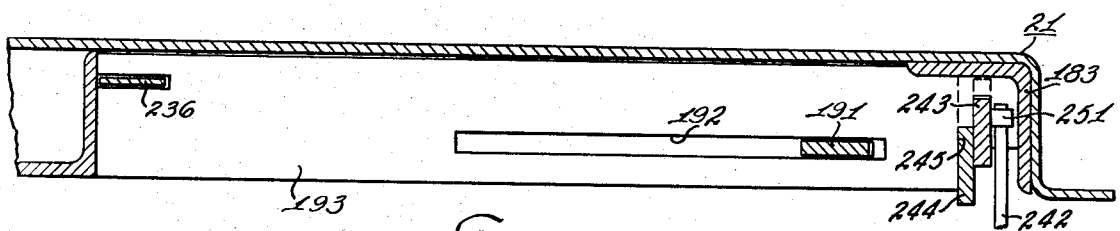
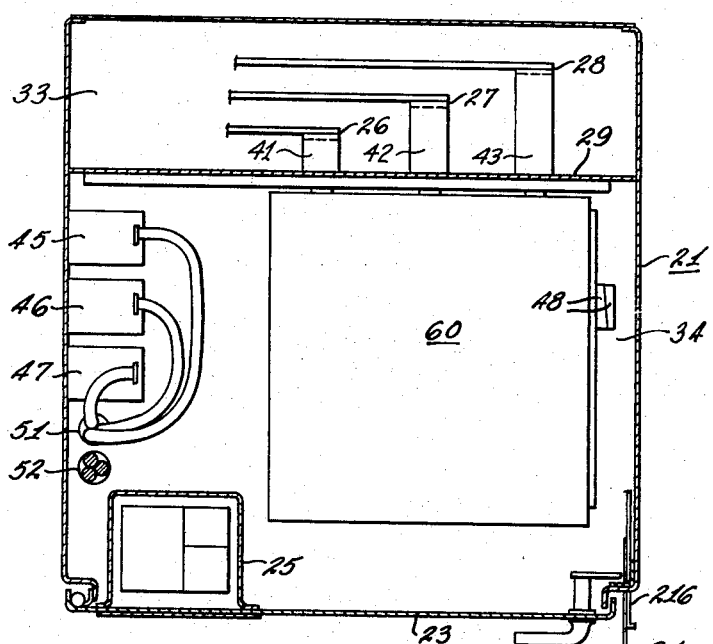
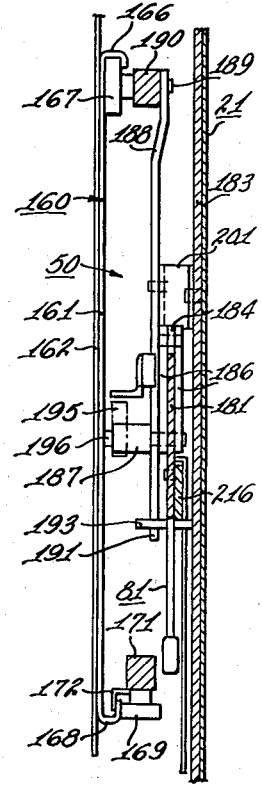
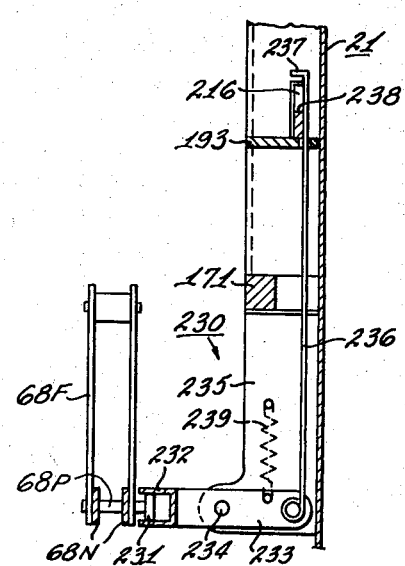
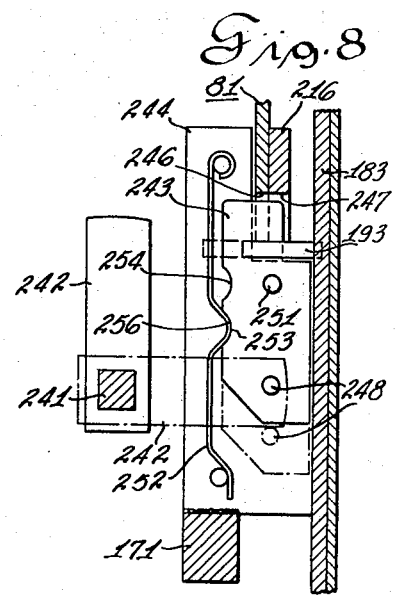

DRAW OUT SWITCHGEAR ASSEMBLY WITH SUSPENDED LINEAR GUIDE SUPPORT MEANS FOR MOVABLE CONTACTOR

BACKGROUND OF THE INVENTION

Manufacturers of controllers have provided numerous techniques for constructing controller apparatus, some of which emphasized the desirability of compactness along with the necessary ability to withstand the forces produced in handling and racking the apparatus into and out of the associated enclosure. The apparatus must also be constructed to withstand the forces produced between circuits and components while withstanding the dynamic forces produced by actuators closing contacts. Previous designs utilized the metal frame as the main structural support. The metal frame carried the insulating supports and the phase insulating barrier for the primary circuits. Such construction requires numerous parts which, in turn, required fasteners all of which necessitated assembly fixturing adjustments as well as creating material inventory problems. Also, manufacturers have resorted to modular unit construction which has more than one contactor per vertical section. This arrangement allows economies in required floor space and some economies in materials per given function. However, a major disadvantage of this type of construction has been to complicate the installation of the user's cables. Prior to modular units, a single set of three phase cables entered a vertical section, but with the modular vertical arrangement one or more additional sets of cables must enter the enclosure. The stacked contactors also require horizontal barriers between them and generally rails or guides are provided on these horizontal barriers to support, position and interlock the drawout contacts with respect to the enclosure.

Additional mechanical and electrical interlocks are often located on the horizontal barriers or shelves. These horizontal barriers complicate access into the vertical section and are generally limited to the drawout side. As a result, cable installation procedures require that the drawout contactors and horizontal barriers, as well as the related mechanical and electrical interlocks, must be removed so that a man with cable pulling equipment can enter the enclosure to pull the cable into the enclosure.

SUMMARY OF THE INVENTION

The invention relates to apparatus including an enclosure having terminal assemblies with appropriate interlocking safety components mounted on the back wall of the enclosure to permit engagement of a plug-in contactor assembly which includes vacuum interrupters, fuses and isolation switch means. The contactor assembly has a single major structural element which is molded of glass polyester as the preferred material, which supports the three phase contactors, the three phase vacuum switches, as well as the fuses and related circuitry. The arrangement is such that the single polyester molding operates as the structural support for the primary circuit component such as disconnect assemblies, fuses and vacuum switches. The structural support is supported on a single side frame assembly thereby eliminating the requirements of a horizontal support plate as well as the rolling structure required for movably supporting the contactor as is utilized in prior art arrangements.

It is the general object of the invention to provide a contactor assembly of simplified construction.

Another object of the invention is to provide a contactor assembly having a single major structural support member.

Still another object of the invention is to provide a contactor assembly having a single major structural support member which is itself supported from a single side frame assembly.

Yet another object of the invention is to provide a contactor structural support member constructed of a single glass polyester molding operable to support the primary circuit components and withstand the forces produced by handling and racking the contactor into and out of the associated enclosure.

A further object of the invention is to provide a contactor assembly having a single structural member which is operable to maintain the proper relationship between components while withstanding the dynamic forces produced by the solenoid closing the contacts of the vacuum switches.

Another object of the invention is to provide a single integrally formed structural member for a contactor assembly as an integrally formed simple, horizontal barrier segregating the contactors to reduce the time and effort required for field removal and installation.

Still another object of the invention is to provide a contactor assembly enclosure having slide supporting means cooperable with the slide structure associated with the contactor structural support member and having interlocking and racking means which are located on the side frame of the enclosure.

Yet another object of the invention is to provide a combined interlocking and contactor racking mechanism which includes interacting safety devices to prevent inadvertant closure of the contactor.

DESCRIPTION OF THE DRAWINGS

FIG. 7 is a plan view of the enclosure of FIG. 1 with the top enclosure removed to show the internal arrangement with the contactor in operative position therein;

FIG. 8 is a fragmentary view in vertical section taken in a plane represented by the line VIII—VIII in FIG. 5, with the door locking mechanism removed;

FIG. 9 is a view in horizontal section taken in a plane represented by the line IX—IX in FIG. 5, showing the door locking mechanism;

FIG. 10 is an enlarged fragmentary view in elevation of the door locking mechanism showing the arrangement for locking the racking and switch operating mechanism; and FIG. 11 is a fragmentary view of the vacuum switch interlocking mechanism taken along line XI—XI in FIG. 5.

DESCRIPTION OF THE INVENTION

Figure 1:
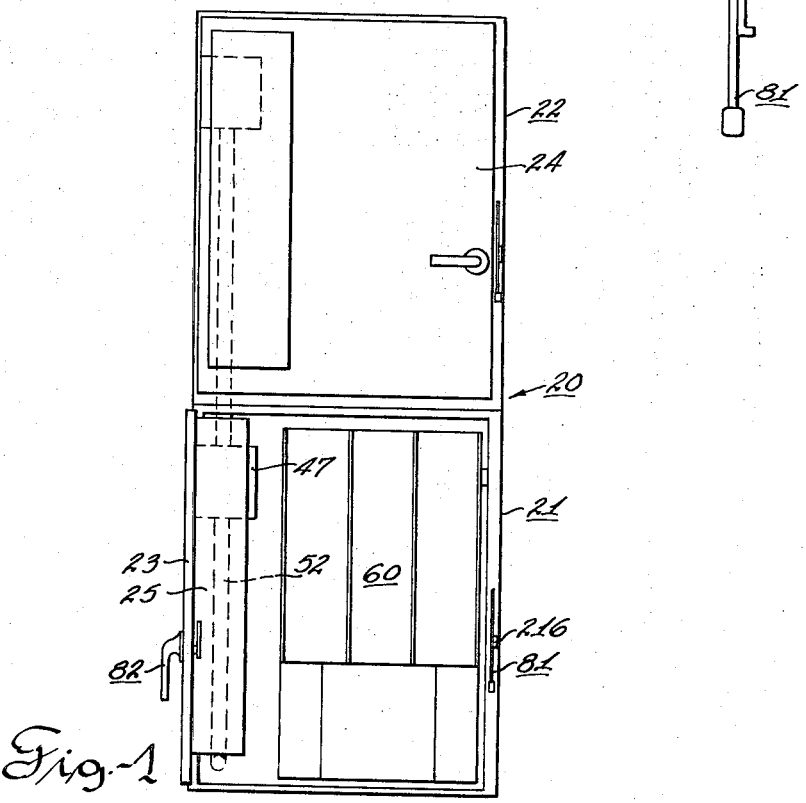
FIG. 1 is a view in front elevation of a stacked two-high motor controller of the invention.

As shown in FIG. 1, the motor controller 20 herein depicted is a stacked two-high metal clad switchgear comprising two separate enclosures 21 and 22 each having separate hinged front opening access doors 23 and 24. Each door 23 and 24 mounts a hinged isolated low voltage control device compartment 25. The enclosures 21 and 22 are similar and a description of the enclosure 21 and the associated components therein will also apply to the enclosure 22 and its associated components.

At the rear of the enclosure 21 are three main power bus bars 26, 27 and 28 which are common to both enclosures. An insulating barrier 29 is provided to divide the enclosure 21 into a rearwardly located line voltage compartment 33 and a forward control or contactor compartment 34. The insulating barrier 29 is provided with three horizontally aligned openings 36, 37 and 38 which provide access to forwardly projecting bayonet stabs 41, 42 and 43 associated with the bus bars 26, 27 and 28, respectively.

Figure 3:
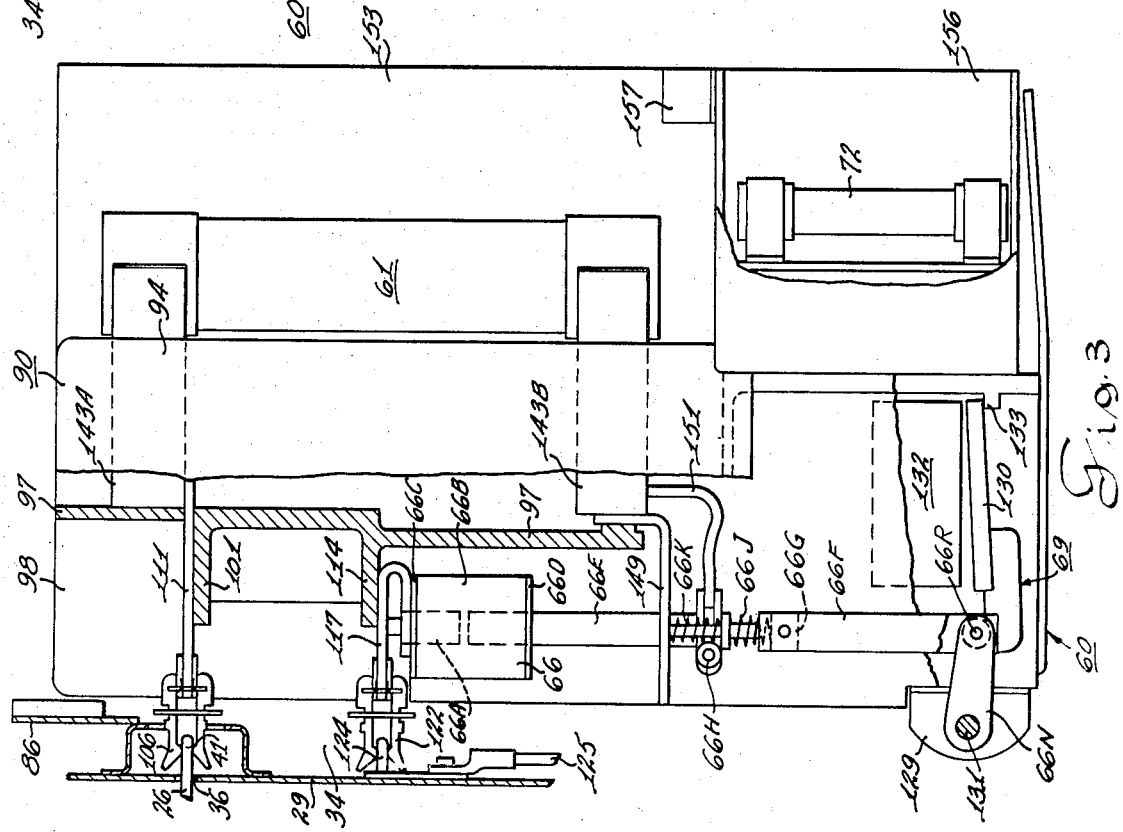
FIG. 3 is a view in left side elevation of the contactor shown in FIG. 2 with parts broken away to show various internal mechanisms.
Figure 6:
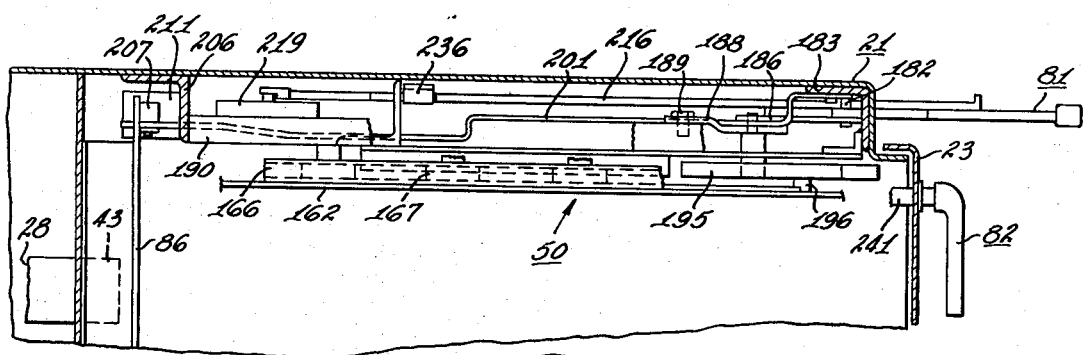
FIG. 6 is a horizontal sectional view taken in a plane represented by the line VI—VI in FIG. 5, showing the racking and interlocking mechanism.
Figure 5:
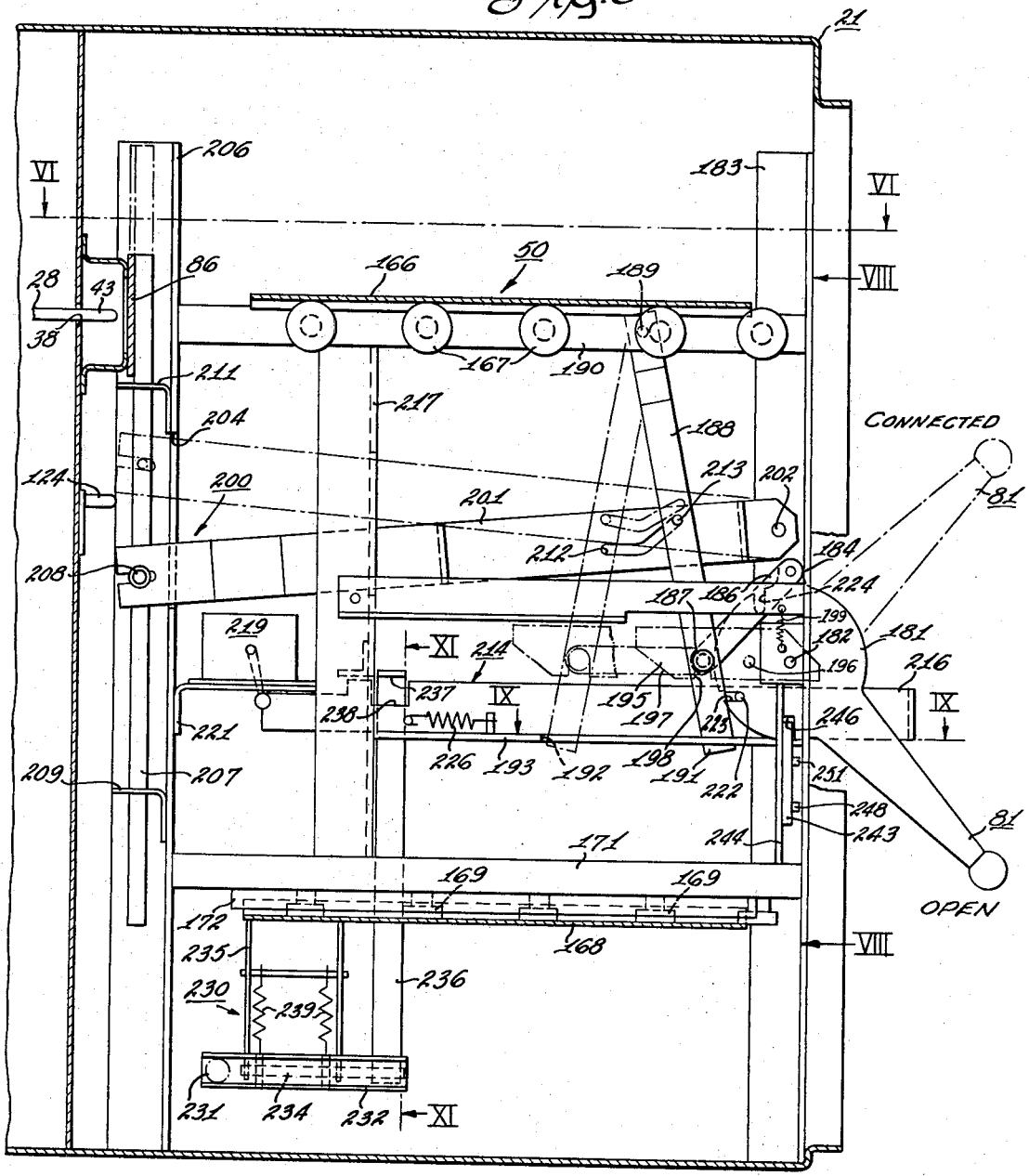
FIG. 5 is a view in vertical section taken in a plane represented by the line V—V in FIG. 2, showing the racking and interlocking mechanisms.

An isolating shutter 86, FIGS. 3, 5 and 6 covers the openings 36, 37 and 38 in the barrier 29 which provide access to the bus bar stabs or line terminals 41, 42 and 43 when the racking mechanism 50 is in the contactor "disconnected" position. This prevents operating and maintenance personnel from accidentally coming into contact with the live line terminals.

Mounted in the contactor or high voltage compartment, as shown in FIG. 7, are current transformers 45, 46 and 47, stationary low voltage disconnect plugs 48, and shutter and racking mechanism 50, shown in detail in FIGS. 5, 6, 8 and 9. Also mounted in the high voltage compartment are load conductors or cables 51 and 52, and drawout contactor 60. The contactor 60 itself, as depicted in FIGS. 2, 3 and 4, mounts current limiting power fuses 61, 62 and 63, vacuum switch phase disconnects 66, 67 and 68, vacuum switch actuator 69, and a control power transformer 71 with two current limiting primary fuses 72 and 73.

Convenient operation of the shutter and racking mechanism 50 is provided by the externally operated handle 81 which pivots from the contactor "connected" to the "disconnect" position. A door handle assembly 82 permits opening the door 23 only in the disconnect position. An indicator (not shown) on the handle gives positive indication of the mechanism position; that is, contactor connected, contactor disconnect.

Figure 4:
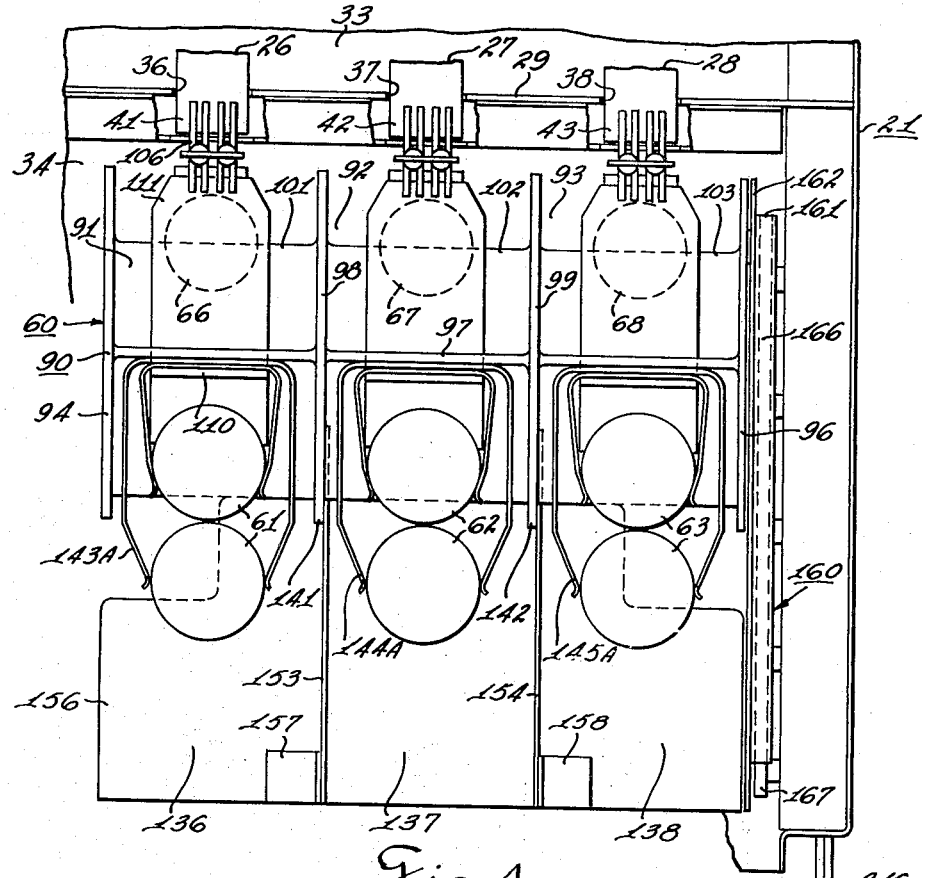
FIG. 4 is a plan view of the contactor and some of the internal mechanism within the enclosure of FIG. 2.
Figure 2:
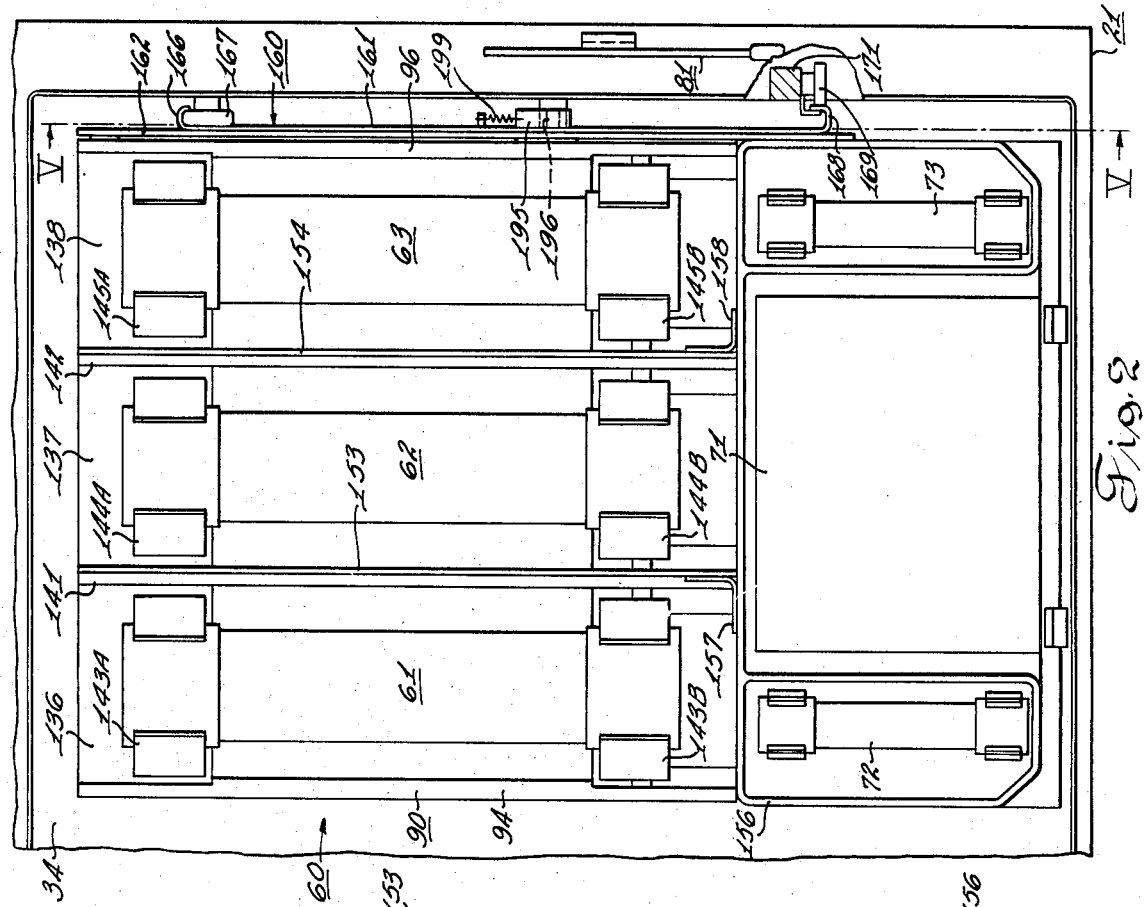
FIG. 2 is an enlarged fragmentary view of the lower motor controller enclosure showing in elevation the arrangement of the contactor therein.

As shown in FIGS. 2, 3 and 4, the contactor 60 includes a one piece glass filled polyester structural support 90 for the primary circuit components such as the fuses 61, 62 and 63 and vacuum switches 66, 67 and 68. The one piece structural support must withstand the forces produced in handling and racking as well as forces produced between circuits and components by carrying fault currents. The structural support must also maintain the proper relationship between components while withstanding the dynamic forces produced by the solenoid closing the vacuum tube contactors. The structural support 90 also serves as the principal insulation between circuits.

As is well known, previous designs of motor controllers utilize a built-up metal component as the main structure support. Attached to the component are insulating supports and barriers for the primary circuits. Thus, the use of the one piece support 90 reduces the number of parts which must be fabricated, inventoried and assembled. In addition, the precision of the one piece molding can be utilized to reduce assembly fixturing during adjustment as compared to the requirements of assembling a large number of individual components.

During the past years there has been a trend for manufacturers of medium voltage controllers to provide the market with modular units which have more than one contactor per vertical section. This feature allows economy in floor space requirements by the user, and generally economics in material required for a given function.

One of the disadvantages of this trend in construction has been to complicate the installation of the user's cables. Whereas previously a single set of three line cables entered a vertical section, now one or more additional sets enter. The stacked contactors require barriers between them, and generally rails or guides are provided on these barriers to support, position and interlock the drawout contactors with respect to the stationary cubicle. Additional mechanical and electrical interlocks are often located on this horizontal shelf. The horizontal barriers and support parts complicate access into the vertical sections, and access is generally limited to the drawout side of this type of equipment. The normal cable installation procedure is to remove the drawout contactors and horizontal members so that a man with cable drawing equipment can enter the cubicle.

The one piece structural support concept and the arrangement of having the support, guidance and interlocking mechanism located on the side frame of the cubicle provide benefits and economies not heretofore possible. With the one piece structural support the horizontal barriers segregating the contactors are relatively simple. This will reduce the time and effort required for full removal and installation. Also, because the important guidance and interlocking features do not have to be disturbed from their factory setting, there is less likelihood of a malfunction due to improper reinstallation.

As previously mentioned, the contactor 60 comprises the single molded structural support 90 which includes three separate isolated compartments 91, 92 and 93. To this end the support 90 includes spaced sidewalls 94 and 96 which are interconnected by a transverse web 97. Extending forwardly of the front face of the transverse web 97 are two vertically spaced dividers 98 and 99 which extend forwardly of the transverse web to provide the compartments 91, 92 and 93 for the three phases. Below the top edge of the transverse web 97 and extending forwardly, each of the compartments 91, 92 and 93 have horizontal supports 101, 102 and 103 which are integrally formed with the walls, web and dividers. Each of the compartments 91, 92 and 93 is similar and the compartment 91 with the associated components therein exemplifies the other compartments 92 and 93. Mounted on the support 101, as shown in FIGS. 3 and 4, is a relatively heavy conductor member 111 that extends forwardly of the transverse web 97 and also extends through the web into the contactor compartment. The conductor has secured to its forwardly projecting end a set of resiliently biased contact fingers 106 that are adapted to engage with the horizontal bus stab 41. Spaced below the support 101 is another horizontal support 114 to which another conductor bar 117 is secured. A set of resiliently biased contact fingers 122 are secured to the projecting end of the conductor bar 117 in position to engage the stab 124 which is connected to a conductor 125 that is electrically connected to the motor (not shown).

Immediately below the conductor bar 117 and secured thereto is a vacuum circuit interrupter or switch 66. The interrupter 66 is provided with the stationary contact 66A which is arranged in a vertical plane with its outer end secured to and electrically connected to the conductor bar 117. As is well known, vacuum interrupters comprise an insulator envelope 66B having a metallic cap or end plate 66C through which the stationary contact extends in sealed relationship therewith. The opposite end of the interrupter 66 is provided with an end plate 66D which is sealed to the axial end of the envelope 66B and is provided with a movable contact member 66E that is disposed in axial alignment with the stationary contact 66A. A flexible shield (not shown) is provided to seal the movable contact 66E to the envelope so as to provide a vacuum tight seal, but allowing limited movement of the movable contact. Actuation of the movable contact 66E is effected by means of a pair of links 66F which are provided with a pivot block 66G in which the lower depending end of the movable contact 66E is secured. Interposed between the pivot block 66G and a contact connector bracket 66H, is a compression spring 66J which operates in conjunction with a pair of equalizing compression springs 66K, one of which is shown, to effect rapid opening of the contacts. Actuation of the movable contact to a close position is effected by means of a lever 130 which is pivotally secured to the lower end of the links 66F by pin 66P. A pivot link 66N has one end pivotally secured by the pin 66P to the lower end of link 66F and its opposite end secured as by being welded to a rotatable rod 131. The rod 131 is rotatably supported in a pair of spaced forwardly projecting brackets 129, one of which is shown. A similar arrangement is provided for the movable contacts of the other vacuum switches 67 and 68. Thus, since each of the movable contact rod links 66F and 68F, and a similar contact rod link (not shown) associated with the middle interrupter switch 67, are connected to the rotatable rod 131 through their associated links 66N, and 68N, and similar links (not shown) associated with the switch 67, upward movement of the lever 130 will effect the simultaneous upward movement of the movable contact rods of all of the vacuum switches 66, 67 and 68. Upward movement of the lever 130 is effected by energizing a control magnet 132. Energization of the magnet 132 attracts the lever 130 which rests on a support ledge 133. As the lever 130 is drawn upwardly, the right hand end of the link 66N (as viewed in FIG. 3) moves upwardly with the contact rod link 66F. As the right end of the link 66N moves upwardly it will cause the rod 131 to rotate thereby pivoting the links 68N and similar links (not shown) associated with switch 67 to pivot upwardly effecting upward movement of their associated movable contact rods of the vacuum switches 67 and 68.

The opposite side of the contactor 60 is likewise provided with three vertical compartments 136, 137 and 138 which are formed by integral portions of the structural support member 90. As shown in FIGS. 2 and 4, a pair of elongated rearwardly projecting vertically spaced divider walls 141 and 142 are integrally formed with and extend outwardly from the face of the web portion 97. Thus, the projecting vertical member 141 functions as the common wall between the compartments 136 and 137 while the vertically projecting member 142 is a common wall between the compartments 137 and 138. Each of the compartments 136, 137 and 138 is provided with a pair of dual fuse clips 143A and 143B, 144A and 144B, and 145A and 145B, Each compartment contains a pair of current limiting fuses 61, 62 and 63. The pair of fuse clips 143A, as shown in FIG. 4, are each formed by a pair of resilient substantially U-shaped members each having a pair of resiliently inwardly projecting fingers which are adapted to engage the contact end of the fuses 61. The other pairs of fuse clips 143B, 144A–144B and 145A–145B are constructed and operate in the manner of the fuse clips 143A. As best shown in FIGS. 3 and 4, the fuse clips 143A are secured to the surface of the conductor bar 111 through an angle bracket 110. The lower pair of fuse clips 143B are carried by an angle bracket 149 which is secured to lower end of the transverse web 97. As depicted, the angle bracket 149 also serves as a top plate against which the pair of springs 66K, one of which is shown in FIG. 3, abut. An electrical connection between the fuse clips 143B and the movable contact rod 66E is established by means of a conductor cable 151 which is electrically connected to the clips 143B and the bracket 66H. A similar arrangement is provided for the pair of clips 144A and 144B as well as for the pair of clips 145A and 145B.

Each of the projecting vertical divider members 141 and 142 are provided with outwardly extending extension plates 153 and 154 which are secured to the associated divider members. A projecting auxiliary base portion 156 is secured to the structural support 90 and serves to support the extensions 153 and 154 by means of angle brackets 157–158. The auxiliary base 156 also serves as a housing for voltage control transformer 71 which provides stepped down voltage to the control magnet 132. The current limiting fuses 72 and 73 are also housed within the auxiliary base 156, as depicted in FIGS. 2 and 3.

The structural support 90 with the associated components mounted thereto is slidably supported for movement into and out of the contactor compartment 34 of the metallic enclosure by a single hanger means 160. To this end, as viewed in FIGS. 2, 4, 6 and 8, the right hand side of the support 90 is provided with a vertical support side plate 161 that extends horizontally substantially the entire depth of the support. For mounting the plate 161 to the support member there is provided an auxiliary wall plate extension 162 which is securely fastened to the right hand wall 96 of the support member 90. The side plate 161 is bolted to the auxiliary wall plate extension 162 and both are secured to the wall 96 of the support member by means of a plurality of securing means such as bolts. The upper horizontal edge portion of the side plate is provided or formed with a lateral outwardly extending flange portion which has its end bent downwardly to form a horizontal extending guideway or trackway 166. The guideway 166 engages on a plurality of horizontally aligned spaced roller members 167 that are rotatably carried on stub shafts mounted in a horizontally disposed bar 190 which is mounted on the vertical angle bars 183 and 206 that are secured to the side wall of the enclosure 21. The lower or bottom edge of the support side plate 161 is formed with a similar guideway 168. The outer edge of lower guideway 168 cooperates with a plurality of spaced restraining rollers 169, which are rotatably mounted on vertical stub shafts mounted in a horizontally extending bar 171 which is fastened to the side wall of enclousre 21. To prevent the contactor 60 from moving laterally to the left, as viewed in FIG. 2, the bar 171 is provided with a horizontal downwardly extending portion 172 which cooperates with the upturned edge of the guideway 168 to prevent lateral leftward movement of the contactor. Lateral rightward movement of the contactor is prevented by means of the rollers 169 which engage against the outer side surface of the upturned edge of the guideway 168. Thus, movement of the contactor 60 into and out of the compartment of the enclosure 21 is facilitated by means of the upper horizontal rollers 167 cooperating with the guideway 166 with guided stability being provided by means of the horizontal rollers 169 and the angle member cooperating with the guideway 168.

It is apparent that the arrangement described above provides a novel, compact and economical combination of a motor control contactor and support therefor which facilitates removal of the contactor from its enclosure. The arrangement provides for clear access to the interior of the contactor compartment without the necessity of dismantling structural portions of the enclosure. Access to the motor cables and other equipment may be had by service personnel with the necessary tools such as cable pullers and the like. Since there is no dismantling of the contactor equipment in order to remove it from the enclosure, the return of the motor controller to service merely requires the plugging in of modular secondary contacts to the contactor and racking the contactor into operative position. There is no field adjustment necessary, and minimum of reassembly to the enclosure.

For racking the contactor 60 into and out of the enclosure 21 there is provided the racking mechanism 50 previously mentioned. As shown in FIG. 5, the racking mechanism 50 is operated remotely from the exterior of the enclosure by means of the handle or lever 81. The lever 81 includes a circular body portion 181 which is supported for pivotal movement about its axis on a stub shaft 182 carried by a fixed bracket 183, as best shown in FIG. 6. The circular body portion 181 of lever 81 is provided with a projection 184 to which is pivotally secured link 186. The opposite end of link 186 is pivotally secured to a pin 187 that is carried by a bar 188. The upper end of the bar 188 is pivotally secured to a pin 189 carried by a horizontal side bar 190 that is mounted adjacent the right side of the enclosure, as shown in FIGS. 5 and 6. To prevent lateral movement of the bar 188 the lower depending end 191 thereof is confined within an elongated slot 192 formed in a horizontal bar 193 as best shown in FIG. 9. Thus, as the lever 81 is moved from its disconnect or open position depicted in full lines in FIG. 5, upwardly to its connected position depicted in dot-dash lines in FIG. 5, the link 186 by operation of the projection 184 will force the bar 188 to pivot on the pin 189 moving from the position it occupies as depicted by the full lines to the position depicted by the dot-dash lines in FIG. 5. To effect racking of the contactor 60 into engagement with the bus bar connectors 26, 27 and 28 through operation of lever 81, the contactor 60 is provided with a hook latch 195, as shown in FIGS. 5 and 6. The hook latch 195 is pivotally secured to a pin 196 that extends horizontally outwardly from the side of the contactor side plate 161. As shown in FIG. 5, the hook latch 195 is provided with a beveled leading surface 197 which engages the pin 187 as the contactor is inserted into the enclosure. Under this condition the hook latch 195 pivots upwardly until a notch 198 formed in the latch aligns with the pin 187. At this instant the latch 195 is spring biased to the horizontal position, depicted in FIG. 5, by means of a tension spring 199, FIGS. 2 and 5 with the pin 187 engaged in the notch. Thus, as the lever 81 is pivoted upwardly from "open" to connected position the link 186 forces the pin 187 forwardly thereby moving the contactor 60 forwardly into connected position.

As previously mentioned, the high voltage bus bar connectors 26, 27 and 28 are shielded from the contactor compartment 34 by operation of a vertically movable shutter 86. In order to coordinate the movement of the shutter 86 from its closed position, depicted in FIG. 5, to its open position, depicted in FIG. 3, and thereby uncover the bus bar connectors 26, 27 and 28, a shutter operating mechanism 200 is provided. As shown in FIG. 5 the shutter operating mechanism 200 is operated by the racking mechanism lever 81. To this end a bar 201 is supported for pivotal movement in a vertical plane by a pin 202 which is carried by an upright corner angle bar 183 of the enclosure 21. The opposite or inner end of the bar 201 extends through an elongated vertical slot 204 formed in a structural angle bar member 206 of the enclosure 21. A pivotal connection is established between the inner end of the bar 201 and a vertically movable rod 207 as at 208. The rod 207 is supported in upright position by brackets 209 and 211 that are secured to the structural angle bar 206. Rod 207 is connected to the shutter 86 by suitable means (not shown). This vertical upward movement of the rod 207 will effect vertical upward movement of the shutter 86 to uncover the bus bar connectors 26, 27 and 28. To effect the vertical movement of rod 207, the bar 201 is provided with an angular cam slot 212 in which a cam follower 213 carried by the bar 188 is moved inwardly by operation of the lever 81. The cam follower 213 tracking in the cam groove or slot 212 forces the bar 201 to pivot upwardly about pin 202. As a result, the inner end of the bar 201 is forced to move upwardly thereby causing the rod 207 to move vertically upwardly to raise the shutter 86. The position of the shutter mechanism 200 after it has been operated to open the shutter 86 is depicted in dot-dash lines in FIG. 5.

To ensure that the racking lever 81 cannot be operated until the contactor 60 is de-energized, an interlock means 214 is provided. The interlock means 214 includes a rod 216 which is supported by horizontal movement by the enclosure 21. The rod 216 has its one end extending outwardly of the enclosure 21 through a suitable opening formed in the angle bar 183, as shown in FIGS. 5 and 6. The inner end of the rod passes through a guide slot formed in a structural angle bar 217. A horizontally disposed plate 193 that extends between the structural angel bar 217 and 183 serves to slidably support the rod 216 in a horizontal plane. The inner end of the rod 216 is disposed to engage the actuating arm of a switch 219 which is carried on a bracket 221 that is secured to the vertical angle bar 206. Inward movement of the rod 216 will effect operation of the switch 219 to a circuit open condition. With the switch 219 connected into the contactor circuit (not shown) actuation of the switch 219 will ensure that the contactor circuit is open so that the contactor cannot be energized.

To ensure that the switch 219 is actuated to open condition prior to moving the lever 81 in either direction, an interlock arrangement is provided. As shown in FIG. 5, the rod 216 is provided with a pin 222 which when the rod is in extended outward position engages in a notch 223 formed in the circular body portion 181 of the lever 81. With the rod 216 in its retracted outward position, as depicted in FIG. 5, the switch 219 is in a circuit closed position. Under this condition the pin 222 is engaged in the notch 223 to prevent movement of the lever 81. In order to move the lever 81 upwardly from its open to its connected position the rod 216 must be actuated inwardly to thereby actuate the the switch 219. This inward movement of the rod disengages the pin 222 from the notch 223 thereby releasing the lever 81. As the lever 81 is moved upwardly, another notch 224 formed in the circular body portion 181 of lever 81 moves from a vertically disposed position to a horizontally disposed position. When this position of the notch 224 is obtained the rod 216 under the influence of a spring 226 will retract to its full outward position with the pin 222 engaging in the notch 224. Under this condition the switch 219 will be biased (by spring means, not shown) to its normal circuit closed position to complete the contactor circuit. It is apparent that in any position of the racking lever 81, the switch 219 must first be actuated to open condition before the racking lever 81 can be moved.

Racking of the contactor 60 must not be accomplished at any time that the vacuum switches 66, 67 and 68 are closed. To ensure that racking of the contactor 60 cannot be accomplished unless the vacuum switches are in open position, an interlock means 230 is provided. As shown in FIGS. 5 and 11, the pin 68P which operates to pivotally connect the links 68F and the horizontal links 68N that are associated with the vacuum switch 68 is provided with a projection 231 which is engaged in a channel bracket 232. The channel bracket 232 is carried on the end of a pivot lever 233 which is pivotally supported on a pin 234 that is mounted in a U-shaped bracket 235 mounted in the enclosure 21. Pivotally secured to the free end of the pivot lever 233 is an elongated rod 236, the upper free end of which is provided with an inwardly projecting thumb portion 237. The thumb portion 237 is constructed and arranged to engage in a notch 238 formed in the switch actuating rod 216, as best shown in FIG. 5. Spring means in the form of tension springs 239 are provided and are connected to the pivot lever 233 at a point between the pin 234 about which the lever 233 pivots and the free end of the lever 233 to which the rod 236 is pivotally connected. Thus the springs 239 normally operate to bias the free end of the lever 233 upwardly thereby positioning the thumb portion 237 of the rod 236 free of the notch 238. This condition is obtained only when the vacuum switches 66, 67 and 68 are in open position, as exemplified by the condition of the vacuum switch 66 in FIG. 3. Thus, when the magnet 132 is energized to effect the movement of the vacuum switch contact rods such as rod 66E to closed position, the lever 233 is drawn upwardly by the magnetic force of magnet 132. As the lever 130 operates to move the link 66F upwardly to effect movement of the contact rod 66E to a closed position, the pivot arms 66N and 68N associated with the vacuum switches and a similar pivot arm (not shown) associated with the switch 67 and exemplified by the arm 66N, all move in synchronization due to the fact that they are all secured as by welding to the rotatable shaft 131. Since the arm 68N is provided with the projection 231 the upward movement of the arm 68N under the influence of the magnet 132 will effect the pivot movement of the lever arm 233 about the pin 234. This pivotal movement is in a clockwise direction, as viewed in FIG. 11, thereby moving the outer end of the lever arm 233 downwardly. This downward movement of the lever arm 233 overcomes the force of the springs 239 and draws the rod 236 downwardly to engage the thumb portion 237 of the rod in the notch 238. It is apparent that when the vacuum switches 66, 67 and 68 are in closed position, the switch actuating rod 216 is locked out and cannot be operated to actuate the switch 219. Since the rod 216 cannot now be actuated the racking lever 81 cannot be moved thereby interlocking the racking mechanism to the contactor's 60 condition.

To further ensure a safe racking operation the operator must have the entrance door 23 of the enclosure 21 fully closed and locked. To this end the door handle 82, as depicted in FIGS. 5, 6, and 10, is mounted on the outwardly extending end of shaft 241. The inner end of shaft 241 is provided with a finger member 242 which, when the handle 82 is positioned so that the door 23 can be opened, is in a vertical position, as shown in FIG. 10. The finger 242 is adapted to cooperate with a movable lock 243, FIGS. 5, 9 and 10, which is operable to lock the switch actuating rod 216 and the racking lever 81 against movement. As shown in FIGS. 5 and 10, the lock 243 is slidably supported for vertical movement on a plate 244 which is welded to the horizontal bar 171 and the horizontal plate 193. The lock 243 extends through a suitable opening 245 formed in the plate 193. In its uppermost locking position the lock 243 engages in a notch 246 and a notch 247 formed in the circular body portion 181 of the lever 81 and the rod 216, respectively, as shown in FIGS. 5 and 10. Movement of the lock 243 between a locking position and a release position is effected by means of the finger 242 operated by the handle 82. In FIGS. 5 and 10, the lock 243 is shown in locking position. In this position the enclosure door 23 may be opened but the switch rod 216 and the racking lever 81 are locked against movement. To release the switch actuating rod 216 and the racking lever 81, the door must be closed and the handle 82 rotated so that the finger 242 is rotated in a clockwise direction, as viewed in FIG. 10. Clockwise rotation of the finger 242 will move the finger into engagement with a pin 248 carried by the lock 243 forcing the lock 243 to move downwardly to disengage from the notches 246 and 247 of the lever 81 and rod 216 to release these members for operation. The finger 242 when moved to the horizontal position wherein the lock 243 is moved to its released position extends behind a vertical structural enclosure corner angle bar 183 to lock the door 23 in closed position. To open the door 23 and lock the lever 81 and rod 216 to prevent their operation, the handle 82 is turned to rotate the finger 242 in a counterclockwise direction from the horizontal dot-dash line position in FIG. 10 to a full line vertical position. As the finger is rotated to a vertical position it engages another pin 251 forcing the lock 243 to move upwardly into engagement with the notches 246 and 247 of the racking lever 81 and the switch actuating rod 216. A spring 252 is mounted on the plate 244 and is provided with a projection 253 that is arranged to cooperate with a lower notch 256 to maintain the lock 243 in its locking position; or with an upper notch 254 to maintain the lock 243 in its release position.

From the foregoing detailed description it is apparent that a novel motor controller arrangement has been provided which incorporates a combination of cooperating mechanisms to provide a single, economical and reliable arrangement. The novel motor controller provides a novel suspension for the contactor with cooperative safety interlocks to provide protection for service personnel.

The embodiments of the invention in which an exclusive property or privilege is claimed are defined as follows:

1. In a drawout type motor controller the combination comprising: an enclosure having an opening providing access into said enclosure; a three phase contactor removably supported in said enclosure; and, a single means on one side of said contactor operatively arranged to cooperatively engage with support means carried by said enclosure for mounting said contactor for suspended linearly guided support into and out of said enclosure.

2. A drawout type motor controller according to claim 1 wherein said means mounting said contactor for suspended linearly guided support includes a single trackway carried by said contactor and a single set of a plurality of spaced rollers carried by said enclosure and cooperatively arranged to support said contactor for suspended linearly guided movement into and out of said enclosure.

3. A drawout type motor controller according to claim 2 including a contactor main frame formed as a single one piece unit; a plurality of rollers carried by said enclosure and mounted to extend inwardly from the inner face of a side wall of said enclosure, said rollers being arranged so as to have their axes of rotation disposed in the same horizontal plane; and a trackway secured to the side of said main frame and being disposed in the horizontal plane in position to cooperatively engage with said rollers of said enclosure for movably supporting said contactor in suspended operative position within said enclosure and in a disengaged withdrawn position.

4. A drawout type motor controller according to claim 2 wherein there is also provided means operable to prevent lateral displacement of said contactor within said enclosure when said contactor is in suspended operative position, said means being also operable to prevent the lateral displacement of said contactor when said contactor is in a withdrawn suspended position.

5. A drawout type motor controller according to claim 4 wherein said means to prevent lateral displacement of said contactor includes a horizontally disposed trackway secured to said contactor at a position below the level of said contactor suspension trackway and a horizontally disposed constraining means carried by said enclosure and constructed and arranged to cooperatively engage with said trackway on said contactor to constrain said contactor against lateral movement in both directions.

6. A drawout type motor controller according to claim 5 wherein said supporting trackway and said constraining trackway are integrally formed with a mounting plate that is secured to the side of said contactor, said supporting trackway and said constraining trackway being integrally formed with said mounting plate in spaced vertical relationship.

7. A drawout type motor controller according to claim 5 wherein said lateral displacement constraining trackway includes a horizontally upwardly extending portion spaced outwardly from the side of said contactor; and, said constraining means mounted on said enclosure includes a plurality of rollers disposed in the same horizontal plane, said rollers being supported for individual rotation about vertical axes which are located in the same vertical plane, said rollers being operably positioned to engage with one side of said upwardly extending portion of said constraining trackway to prevent lateral movement of said contactor in a first direction; and, a horizontally extending member having a depending portion arranged to extend into said trackway in position to engage with the opposite side of said upwardly extending portion of said constraining trackway to prevent lateral movement of said contactor in a second direction.

8. A drawout motor controller according to claim 4 wherein said enclosure is provided with spaced high voltage bus bars one for each phase and having connecting means;
   an insulating barrier in said enclosure operating to form a high voltage compartment in which said bus bars are located, and a contactor compartment;
   a plurality of openings in said barrier one for each bus bar connecting means providing access from said contactor compartment to said bus bar connecting means;
   a shutter supported for movement between a closed position wherein it operates to block said openings in said barrier to prevent access to said bus bar connecting means and to an open position wherein said barrier openings are uncovered to expose said bus bar connecting means; and,
   racking means operable when actuated in one direction to move said shutter to its open position and simultaneously move said contactor into operating position wherein the primary contacts of said contactor are engaged with said connecting means of said bus bars.

9. A drawout motor controller according to claim 8 wherein there is provided a disconnecting switch operably interconnected into the secondary control circuit of said contactor, said switch being normally biased to a circuit closed position;
   a rod movably supported in said enclosure and movable between an outwardly biased retracted position and to an actuated position wherein it acutates said switch to an open circuit position to interrupt said contactor secondary contact circuit; and, means on said rod to interlock with said racking means to prevent operation of said racking means when said rod is in its outward retracted position in which position said switch is in its normal biased circuit closed position.

10. A drawout motor controller according to claim 9 wherein said contactor is provided with a hook latch member; and, said racking means includes a pin engageable with said hook latch on said contactor to force said contactor into operating position upon actuation of said racking means in said one direction.

11. A drawout motor controller according to claim 10 wherein said contactor includes a plurality of vacuum switches and there is provided an interlocking means operable to prevent the movement of said disconnecting switch actuator rod when one or more of said plurality of vacuum switches are in closed position, said interlocking means being moved to a disengaged position to release said switch actuating rod when all of said vacuum switches are in open position.

12. A drawout motor controller according to claim 8 wherein said racking means includes a lever extending outwardly of said enclosure, said lever extending into said enclosure and being suppported for pivotal movement between a first open position and a second connected position;

a first bar having a pivot support at one end about which it moves;

a link having one end thereof pivotally connected to the inner end of said lever and having its opposite end pivotally connected to said bar;

a contactor engaging means carried by said bar in position to be moved into engagement with said contactor to move said contactor in accordance with the movement of said lever; and, whereby movement of said lever from its first position to its second position operates through said link to effect pivotal movement of said bar to move said contactor engaging means into engagement with said contactor to move said contactor into a connected position.

13. A drawout motor controller according to claim 12 wherein said shutter is secured to a movable rod for movement between its closed position and an open position;

a shutter bar having one end pivotally secured to said rod, said bar having its opposite end pivotally anchored to said enclosure for establishing a pivot point about which said bar will pivot;

a cam slot in said bar;

a cam follower carried by said first bar of said racking means and engaged in said cam slot;

whereby pivotal movement of said first bar of said racking means by operation of said rack lever being moved from its open position to its connected position effects the movement of said cam follower in said cam slot to move said shutter bar upwardly thereby effecting upward movement of said shutter rod to move said shutter to its open position.

* * * * *